(12) United States Patent
Lehser

(10) Patent No.: US 8,750,859 B2
(45) Date of Patent: Jun. 10, 2014

(54) ANTENNA MANAGEMENT SYSTEM AND PROGRAM FOR OPTIMIZATION OF BROADCAST CHARACTERISTICS OF AN ANTENNA AND METHOD FOR DETERMINING PHYSICAL PARAMETERS OF AN ANTENNA

(75) Inventor: Frank Lehser, Bonn (DE)

(73) Assignee: Deutsche Telekom AG, Bonn (DE)

( * ) Notice: Subject to any disclaimer, the term of this patent is extended or adjusted under 35 U.S.C. 154(b) by 718 days.

(21) Appl. No.: 12/964,805

(22) Filed: Dec. 10, 2010

(65) Prior Publication Data

US 2011/0143746 A1    Jun. 16, 2011

Related U.S. Application Data

(60) Provisional application No. 61/285,717, filed on Dec. 11, 2009.

(30) Foreign Application Priority Data

Dec. 11, 2009   (EP) ..................................... 09015348

(51) Int. Cl.
*H04W 4/00*   (2009.01)
*H04W 24/00*   (2009.01)

(52) U.S. Cl.
USPC ........................................................ 455/423

(58) Field of Classification Search
USPC .............. 455/466, 404.2, 425, 423, 438, 446, 455/436, 440, 562.1, 450, 513; 370/241, 370/224, 468, 252; 709/225, 219
See application file for complete search history.

(56) References Cited

U.S. PATENT DOCUMENTS

| | | | |
|---|---|---|---|
| 6,829,491 B1 | 12/2004 | Yea et al. | |
| 6,937,863 B1 * | 8/2005 | Gordon et al. | 455/446 |
| 7,035,618 B2 * | 4/2006 | Schnurr | 455/404.2 |
| 7,076,246 B2 * | 7/2006 | Chitrapu | 455/425 |
| 7,080,144 B2 * | 7/2006 | Boehmke | 709/225 |
| 7,088,997 B1 * | 8/2006 | Boehmke | 455/423 |
| 7,099,660 B2 * | 8/2006 | Boehmke | 455/423 |
| 7,110,766 B1 * | 9/2006 | Tayloe et al. | 455/438 |
| 7,113,789 B1 * | 9/2006 | Boehmke | 455/446 |
| 7,133,366 B2 * | 11/2006 | Zeira et al. | 370/241 |
| 2008/0273506 A1 | 11/2008 | Kezys | |

FOREIGN PATENT DOCUMENTS

WO   WO 2009/097282 A1   8/2009

OTHER PUBLICATIONS

Search Report from corresponding European Patent Application No. 09015348.7 dated May 19, 2010.

* cited by examiner

*Primary Examiner* — Melody Mehrpour
(74) *Attorney, Agent, or Firm* — Leydig, Voit & Mayer, Ltd.

(57) ABSTRACT

A method for determining physical parameters of an antenna of a mobile network base station includes providing, using the antenna, a mobile radio cell of a mobile network. Cellular parameters of the mobile radio cell are measured using at least one of user equipments and further mobile network base stations. The cellular parameters are transmitted from the at least one of user equipments and further mobile network base stations to an antenna controller. Using the antenna controller, at least one of the physical parameters of the antenna is determined based on the cellular parameters and at least one of a history of the cellular parameters, as measured by the user equipments, and a history of physical parameters of the antenna.

11 Claims, 3 Drawing Sheets

ANTENNA MANAGEMENT SYSTEM AND PROGRAM FOR OPTIMIZATION OF BROADCAST CHARACTERISTICS OF AN ANTENNA AND METHOD FOR DETERMINING PHYSICAL PARAMETERS OF AN ANTENNA

CROSS-REFERENCE TO PRIOR APPLICATIONS

Priority is claimed to U.S. Provisional Application No. 61/285,717, filed on Dec. 11, 2009, the entire disclosure of which is hereby incorporated by reference herein.

FIELD

The present invention relates to an antenna management system and a program for optimization of broadcast characteristics of an antenna and a method for detecting physical parameters of an antenna and a computer program product.

BACKGROUND

In today's radio networks optimization is needed for a lot of parameters controlling the behavior of the network. For the antenna the characteristics like the azimuth or tilt have got an essential impact on the propagation of radio signals and therefore on radio coverage of the dedicated cells. Both parameters tilt and azimuth influent essentially the interference situation in a radio network and the overall network RF power needed to cover a certain area.

Typically, these parameters are set during installation manually in a physical way and are static during the time. The antenna builder installs the antenna regarding requirements on physical azimuth and tilt of a network operator and considering the antenna specification of an antenna supplier. Firstly, this procedure is prone to errors and secondly every change during lifetime of the antenna must be done manually which causes costs for site visits.

Another solution is described in WO 2009/097 282 A1, which discloses an antenna management system for managing cellular communications network antennas remotely in response to traffic demands and environmental factors, including a packet switching network, antennas, base transceiver stations, tilt controllers, air interface modules, a management database, and a control network. The system utilizes feedback from a variety of sensors including downtilt sensors, azimuth sensors, weather sensors, gas sensors, and a camera, for instance. The system enables data from the sensors to be viewed remotely and analyzed to determine if corrective adjustment of the antenna is needed. After analyzing the data, the system or a user of the system such as a network operator can remotely adjust the antenna to make necessary adjustments.

The system further enables data received from the sensors to be made available over a packet switching network, such as the Internet or a local or wide area network, to any device, such as a computer or mobile station, connected to the packet switching network.

The method according to the prior art is based on the detection of physical orientation of the antenna by using indicators directly at the physical antenna for measuring the azimuth and tilt physically. The drawback of such an approach is that the antenna has to be provided with cost-intensive sensors for measuring the orientation of the antenna, like mechanical sensors measuring downtilt or azimuth of the antenna. Furthermore, suchlike sensors need calibration and maintenance and causes of course constructive efforts resulting in higher costs for the antenna system.

SUMMARY

In an embodiment, the present invention provides a method for determining physical parameters of an antenna of a mobile network base station. Using the antenna, a mobile radio cell of a mobile network is provided. Cellular parameters of the mobile radio cell are measured using at least one of user equipments and further mobile network base stations. The cellular parameters are transmitted from the at least one of user equipments and further mobile network base stations to an antenna controller. Using the antenna controller, at least one of the physical parameters of the antenna is determined based on the cellular parameters and at least one of a history of the cellular parameters, as measured by the user equipments, and a history of physical parameters of the antenna.

BRIEF DESCRIPTION OF THE DRAWINGS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. Other features and advantages of various embodiments of the present invention will become apparent by reading the following detailed description with reference to the attached drawings which illustrate the following:

DETAILED DESCRIPTION

Figure 1:
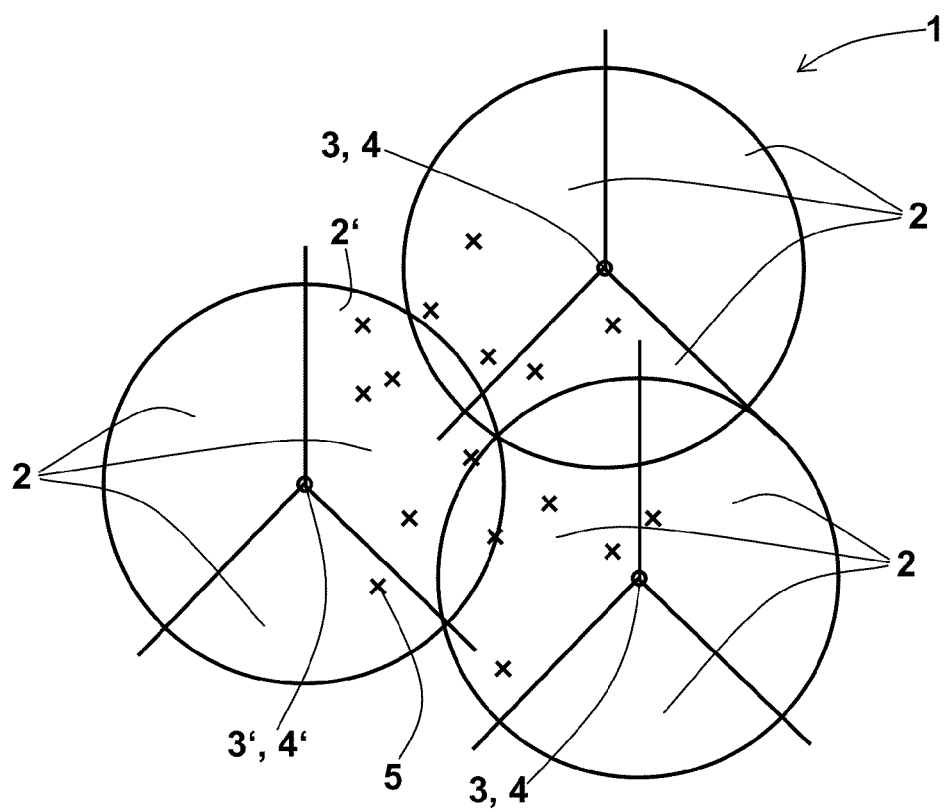
FIG. 1 schematically illustrates an exemplary cluster of multiple mobile radio cells.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In an embodiment, the present invention provides a method for detecting physical parameters of an antenna of a mobile network base station, as well as a method, an antenna management system and a program for optimization of broadcast characteristics of an antenna of a mobile network base station which are comparatively efficient and cost-effective and which could be implemented very easily and without any need for additional sensors.

In an embodiment of the present invention, a method for determining physical parameters of an antenna of a mobile network base station is provided and includes the steps of providing a mobile radio cell of a mobile network by the antenna in a first step, measuring cellular parameters of the mobile radio cell by multiple user equipments and/or further mobile network base stations in a second step, transmitting the cellular parameters from the user equipments and/or the further mobile network base stations to an antenna controller in a third step and determining at least one physical parameter of the antenna in dependency of the cellular parameters by the antenna controller in a fourth step, wherein the history of the cellular parameters measured by certain user equipment and/or the history of physical parameters of the antenna are taken into consideration.

According to an embodiment of the present invention, it is thereby advantageously possible that the physical parameters, preferably the azimuth and/or the tilt of the antenna, are determined by cellular parameters delivered by radio measurements accomplished by user equipments provided inside or near the coverage area of the mobile network base station. In particular, the present invention provides, in an embodiment, an automatic determination of the physical antenna orientation without the need for additional sensors or other cost-intensive hardware, as the cellular parameters are measured by the user equipments which are already located inside or near the coverage area. Consequently, the method according to an embodiment of the present invention is feasible for implementation in existing cellular radio networks as no physical setup efforts are required. Furthermore, this method is operable during common operating conditions of the mobile network base station. The radio measurements can be considered as single measurement values or average values of several single measurements. Preferably, the radio measurements are performed by suchlike user equipments, e.g. mobile stations, which see several mobile network base stations. In principle, further mobile network base stations are feasible for measuring cellular parameters of the mobile radio cell to derive information concerning the orientation of the antenna. The physical parameters preferably relate to every parameter affecting the direction and geometry of the electromagnetic fields emitted by the antenna. According to an embodiment of the present invention, the history of radio measurements, cellular parameters, physical parameters and/or antenna adjustments is stored by the antenna controller and taken into consideration for determining the at least one physical parameter of the antenna. This helps to increase the accuracy of the determination of the physical and/or cellular parameters and to optimize the orientation of the antenna. In particular, the antenna adjustment can be improved by elaborating the history to identify certain patterns of coverage or capacity requirements in the mobile radio cell, for instance. When using history data over a certain period of time and in case that the assumption is verified that user uses their mobile stations often at the same locations, a very clear picture about local radio distribution and their changes is possible to be elaborated by means of the inventive method.

According to an embodiment of the present invention, it is furthermore preferred that the history of the cellular parameters measured by certain user equipments is measured over a predetermined period of time such as a day or a week or a month or a year. It is further preferred that a variable or adaptable consideration of the historic values of the measured cellular parameters takes place. This means that in case, e.g., of special events such a trade fairs or the like, other typical usage pattern can resulting from another distribution of mobile stations such that another type of setting of the physical parameters of the antenna is more preferably than a type of setting of the physical parameters of the antenna during a period of time where no trade fair takes place.

Preferably, the mobile network base station has got a link to connected user equipments via the antenna and has access to all signal data like RF measurements of received power and quality related indicators, as well as signal data concerning neighbor mobile network base stations measured by connected user equipment.

In particular, the measurements given in a cell cluster of many mobile stations (or cells) (e.g. signal strengths, propagation time measurements like timing advance and interference indicators) combined with the knowledge of location of these cells and related mobile stations can be processed to generate information on the azimuth and tilt of a single cell's antenna.

In an embodiment of the present invention, the radio measurements accomplished by the user equipments relate to signal strength values, i.e. received power of signals of serving mobile network base station are measured by user equipments, signal delay, i.e. measured delay indicating the length between the respective user equipment and the mobile network base station, data throughput of data calls with a given bandwidth, bit error rate, handover failure rate and/or call drop rate.

In another embodiment of the present invention, the respective positions of the user equipments are determined in a fifth step prior to the fourth step. Advantageously, the radio measurements given in a cell cluster of many mobile radio cells combined with the positing data of these cells and related user equipments can be processed to generate physical parameters on the actual azimuth and tilt of a single cell's antenna, for instance. Suchlike positioning data of the user equipments are based on GPS coordinates or indirectly given by cell identification or RF typical fingerprints. The positioning data are assumed to be linked with other information like radio measurements and mobile network typical information like call drops, handover failures etc.

In a further embodiment of the present invention, an actuator is controlled by the antenna controller in order to optimize the orientation of the antenna in dependency of the physical parameters in a sixth step. Preferably, the actuator comprises a mechanical servo which is remotely controlled by the antenna controller for optimizing the antenna's orientation. In particular, at least the second, third, fourth and sixth steps are iteratively repeated until the antenna's orientation is optimized. Preferably, the method according to present invention is performed as a self-organizing procedure in such a manner that the orientation of a single antenna or the respective orientations of multiple antennas are optimized by the antenna controller or by multiple antenna controllers automatically. In another embodiment of the present invention, other characteristics of the antenna like antenna gain and beam width can also be changed remotely by appropriate radio measurements accomplished by the user equipments and/or further radio network base stations. In this case, also characteristics of the radio network base station, e.g. power gain, are responsible for remote control in dependency of the radio measurements.

In an embodiment, the present invention provides a method for optimization of broadcast characteristics of an antenna of a mobile network base station comprising the steps of providing a mobile radio cell by the antenna in a first step, measuring cellular parameters of the mobile radio cell by multiple user equipments in a second step and adjusting the orientation of the antenna in dependency of the cellular parameters in order to optimize the orientation of the antenna in a sixth step.

According to an embodiment of the present invention, it is thereby advantageously possible that the settings, in particular the azimuth and the tilt, of the antenna orientation are automatically adjusted to optimize overall network performance and/or to optimize network performance at certain locations and/or in certain time intervals. In particular, the network performance is adapted to serve traffic hot spots and/or to prevent local problem areas as coverage holes or capacity lacks, for instance. Furthermore, the method for optimization the broadcast characteristics is used to increase the capacity (e.g. bandwidth) of the mobile network at least temporarily at certain locations, particularly at so called hot spots where a lot of user traffic is expected in certain time intervals, for instance. Therefore, the adjustment of the antenna is preferably accomplished in dependency of time, preferably daytime, date, weekday, season or the like. Preferably, the method according to present invention is repeated iteratively and performed as a self-organizing procedure in such a manner that the orientation of a single antenna or the respective orientations of multiple antennas are optimized by the antenna controller or by multiple antenna controllers automatically. In particular, the cellular parameters are obtained via radio measurements of the user equipments and/or further mobile network base stations, as described above.

In an embodiment of the present invention, a cluster of multiple mobile radio cells is provided by multiple mobile network base stations each comprising at least one antenna in the first step, wherein cellular parameters of the multiple mobile radio cells are measured by user equipments provided inside the coverage area of the cluster in the second step and wherein the orientation of at least one of the antennas is adjusted in dependency of the cellular parameters in order to optimize the broadcast characteristics of the at least one antenna. Preferably, also the respective positions of the user equipments are determined, so that the radio measurements given in a cell cluster of many mobile radio cells can advantageously be combined with the knowledge of location of these cells to generate physical parameters on the actual azimuth and tilt of a single cell's antenna and/or to adjust the antenna's orientation, for instance. The positioning data of the user equipments are based on GPS coordinates or indirectly given by cell identification or RF typical fingerprints.

Additional embodiments of the present invention relate to an antenna management system for optimization of broadcast characteristics of an antenna of a mobile network base station comprising the mobile network base station having at least one antenna and providing a mobile radio cell, multiple user equipments located in the coverage area of the mobile network base station and an actuator for adjusting the orientation of the at least one antenna, wherein the actuator is controlled by an antenna controller in dependency of cellular parameters measured by the user equipments, wherein the history of the cellular parameters measured by certain user equipment and/or the history of physical parameters of the antenna are taken into consideration.

Further embodiments of the present invention, relate to a program for optimization of broadcast characteristics of an antenna of a mobile network base station comprising a computer readable program code for controlling an actuator for adjusting the orientation of an antenna of the mobile network base station providing a mobile radio cell, wherein the actuator is controlled in dependency of cellular parameters measured by multiple user equipments located in the coverage area of the mobile radio cell.

Further embodiments of the present invention relate to a computer program product comprising a program for controlling an actuator, as mentioned above.

FIG. 1 shows schematically an exemplary cluster 1 of multiple mobile radio cells 2. The multiple mobile radio cells 2 are provided by three mobile network base stations 3. Each of the mobile radio cells 2 are provided by at least one antenna 4. Furthermore, user equipments 5, also referred to as mobile stations 5, are located in the coverage areas of certain mobile radio cells 2. The tilt and the azimuth of at least one antenna 4' of a certain mobile network base station 3' is determined by a method for detecting physical parameters of an antenna of a mobile network base station according to an exemplary embodiment of the present invention, wherein at least a couple of mobile stations 5 measures cellular parameters of the mobile radio cells 2' provided by the antenna 4'.

Suchlike cellular parameters are signal strength values, i.e. received power of signals of the serving mobile network base station 3' are measured by the mobile stations 5', signal delay, i.e. measured delay indicating the length between the respective mobile stations 5' and the serving mobile network base stations 3', data throughput of data calls with a given bandwidth, bit error rate, handover failure rate, call drop rate or the like. Furthermore, the positions of the mobile stations 3' are determined by using GPS coordinates and/or cell identification and/or RF typical fingerprints. In subsequent steps the cellular parameters and the positioning data are combined with each other as indicators for determination of physical parameters of the certain antenna 4'. In particular, the azimuth and the tilt of the antenna 4' are evaluated in dependency of both the cellular parameters and the positioning data.

The physical parameters can be used e.g. for adapting the azimuth and tilt of the antenna 4' by usage of remotely controlled actuators and/or for verification of a required orientation of the antenna 4' after installing the antenna or after a storm or vandalism or the like. Preferably, the actuator is remotely controllable via cable, Internet, LAN, WLAN, Bluetooth or the like.

Consequently, FIG. 1 demonstrates a scenario that multiple mobile stations 5 each with well-known positions deliver signal strength values (normalized based on knowledge of sent power of mobile network base stations 3) providing an antenna diagram of the distribution and range of the different mobile radio cells 2. The purpose of the knowledge of the antenna diagram is to improve efficiency of the mobile communication network and preferably to provide an almost real-time self-organizing mechanism for optimization of the orientation of the antenna's 4 which strongly depends on the actual environmental conditions, e.g. actual coverage and capacity requirements of the network.

The characteristics of the antenna 4' like the azimuth or tilt have got an essential impact on the propagation of radio signals and therefore on radio coverage of the dedicated mobile radio cell 2'. Both parameter essentially influents the interference in the network and the overall network RF power needed to cover a certain area. These are significant variables together with some other main antenna characteristics like antenna gain and beam width and last but not least the used RF power influencing the electromagnetic contamination which can be minimized by the here within described methods. It is a great advantage of the present invention that the antenna parameters can be configured highly dynamically, so that the antenna power can be used very efficient and therefore the electromagnetic contamination is always reduced to the minimum.

Figure 2A:
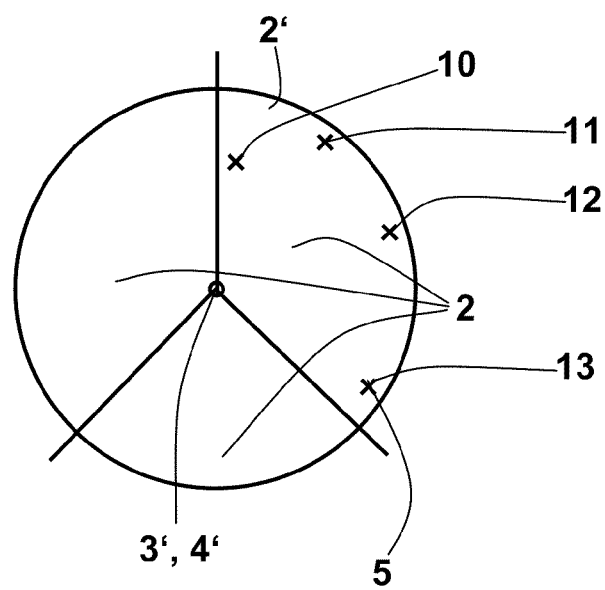
FIGS. 2a and 2b schematically illustrate exemplary radio cells provided by mobile network base stations.
Figure 2B:
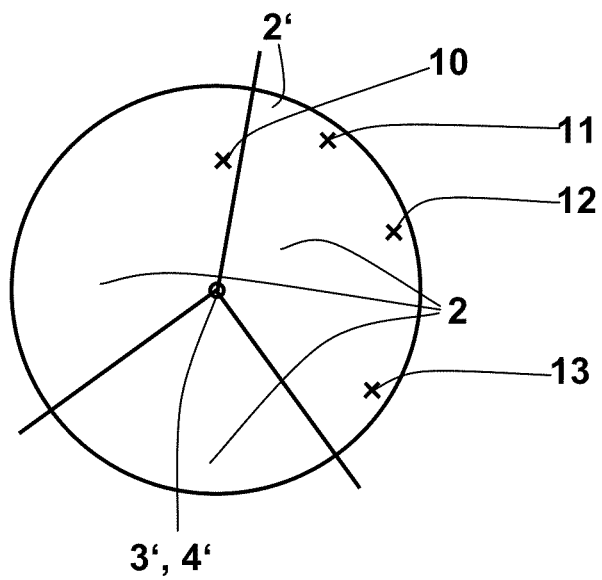
Figure 3:
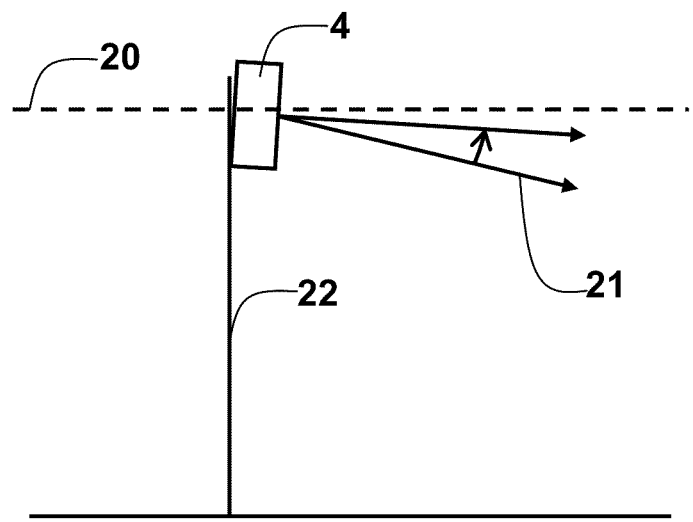
FIG. 3 schematically illustrates an exemplary antenna management system according to an embodiment of the present invention.

FIGS. 2a and 2b schematically show an exemplary single mobile network base station 3' providing inter alia a certain mobile radio cell 2'. In the present example, mainly a first mobile station 10, a second mobile station 11, a third mobile station 12 and a fourth mobile station 13, each located in the coverage area of the mobile radio cell 2', are considered. The variation of the respective signal strength received by the first, second, third and fourth mobile station 10, 11, 12, 13 from the mobile network base station 3' depends on the tilt of the corresponding antenna 4', wherein the tilt is the angle between the main emitting direction 21 of the antenna 4' and the horizontal plane 20 at the location of the antenna 4' (as illustrated in FIG. 3). The horizontal plane 20 is aligned perpendicular to the gravitational field. For example, increasing the tilt of the antenna 4' causes decreased first signal strength received by the first mobile station 10 and decreased fourth signal strength received by the fourth mobile station 13, whereby the first and the fourth signal strength decrease similarly about a constant first value. Simultaneously, also a second signal strength received by the second mobile station 11 and a third signal strength received by the third mobile station 12 decrease as a consequence of the increased tilt, whereby the second and the third signal strength increase similarly about a constant second value. The decreased first, second, third and fourth signal strength follows from the decreased range of the mobile radio cell 2' of the deviated antenna 4'. This effect depends on the distance between the antenna 4' and the respective mobile stations, so that the first value deviates from the second value. With stronger increase of tilt the first and fourth mobile stations 10, 13 could see the neighbor mobile radio cells 2" because these mobile radio cells 2" become more dominant assuming that their tilts have not been changed.

FIG. 2b illustrates another example, wherein the azimuth of the antenna 4' has been changed by rotating the antenna 4' about 10° (e.g. relative to the north direction 100) in the horizontal plane 20 compared to FIG. 2a. Consequently, the first signal strength decreases as the first mobile station 10 is no longer located in the main coverage area of the mobile radio cell 2', wherein the fourth signal strength increases as the fourth mobile station 13 moves away from the boundary area of the mobile radio cell 2'. It has been shown, that the first, second, third and fourth signal strength depends on the azimuth and the tilt of the antenna 4'. Consequently, the knowledge of the positions of the first, second, third and fourth mobile stations 10, 11, 12, 13 provides the determination of physical parameters, particularly the azimuth and/or the tilt, of the antenna 4'. The accuracy of this method can be increased preferably by using further cellular parameters about the mobile radio cell 2' delivered by neighbor mobile network base stations, for instance.

Figure 4:
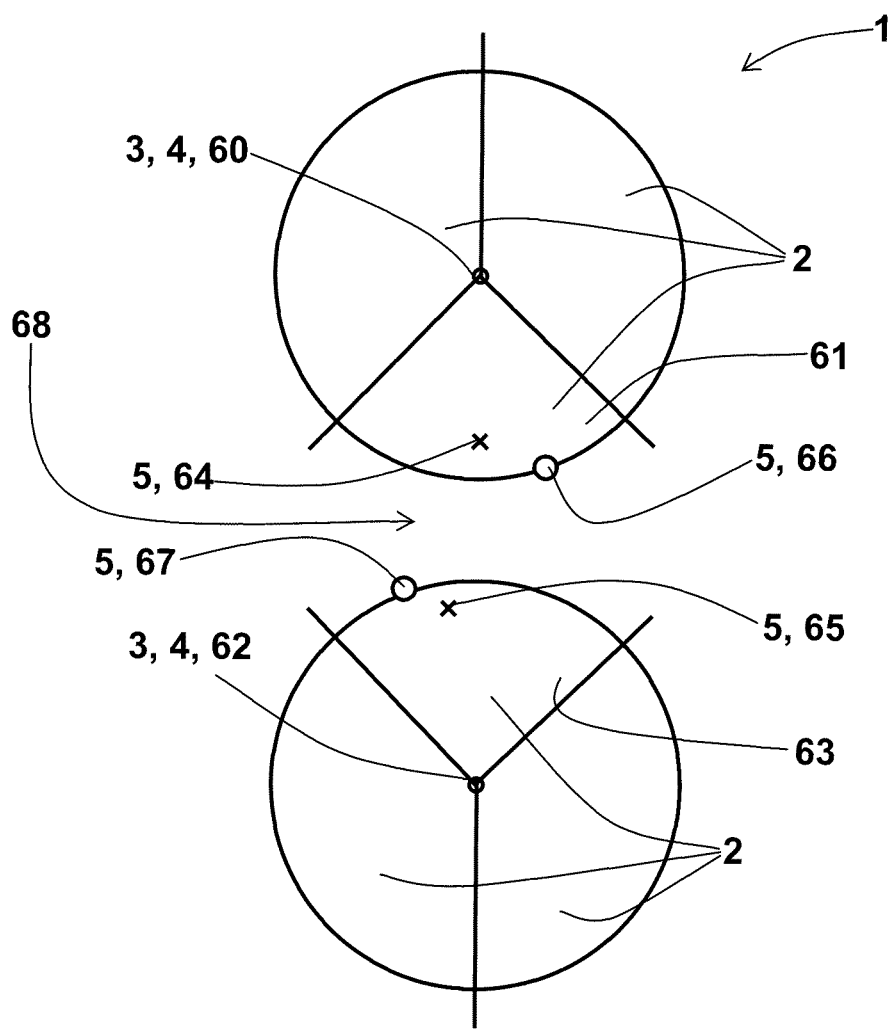
FIG. 4 schematically illustrates another exemplary cluster of multiple mobile radio cells.

FIG. 4 shows schematically an exemplary antenna management system according to the present invention, wherein the antenna management system comprises an antenna 4' attached to a radio mast 22. The tilt of the antenna 4' corresponds to an angle between the main emitting direction 21 of the antenna 4' and the horizontal plane 20 at the location of the antenna 4'. In accordance with the example of FIG. 2a the tilt of the antenna 4' is increased by rotating the antenna 4' in an anti-clockwise direction (in the drawing plane). Preferably, the adjustment of the orientation of the antenna 4' is accomplished by an actuator (not shown in FIG. 4) which is controlled in dependency of the cellular and/or physical parameters by an antenna controller.

Preferably, the history of radio measurements, cellular parameters, physical parameters and/or antenna adjustments is stored by the antenna controller. This helps to increase the accuracy of the determination of the physical and/or cellular parameters and to optimize the orientation of the antenna 4'.

In particular, the antenna adjustment can be improved by elaborating the history to identify certain patterns of coverage or capacity requirements in the mobile radio cell 2', for instance. Over a longer time history, and under the assumption that users use their mobile stations 2 often at the same locations, a very clear picture about local radio distribution and their changes can be elaborated. Particularly, as the mobile station 2 characteristics like antenna gain, specific failure for measurements and the like are neutralised because really the same mobile stations 2 are used for deriving information of network changes. Consequently, the method according to an embodiment of the present invention increases the accuracy of radio measurements for problem cases, in which higher accuracy is needed. It is assumed that for most optimization problems in a mobile network the statistical approach of the mobile stations 2 based on radio measurements are sufficient and can average specific mobile station characteristics.

FIG. 5 shows schematically another exemplary cluster 1 of multiple mobile radio cells 2, wherein a method for optimization of broadcast characteristics of an antenna of a mobile network base station according to another exemplary embodiment of the present invention is described herein. In the present example, a tilt optimization of at least one antenna 4 is automatically performed as a result of coverage problems between two adjacent mobile radio cells 2. A first mobile network base station 60 provides a first mobile radio cell 61 and second mobile network base station 62 provides a second mobile radio cell 63. A first mobile station 64 is located inside the coverage area of the first mobile radio cell 61 and a second mobile station 65 is located inside the coverage area of the second mobile radio cell 64. Furthermore, a third mobile station 66 is located in the boundary of the coverage area of the first mobile radio cell 61, wherein a fourth mobile station 67 is located in the boundary of the coverage area of the second mobile radio cell 63. For determining the broadcast characteristics of the first and second mobile network base stations 60, 62, the first, second, third and fourth mobile stations 64, 65, 66, 67 measures cellular parameters of the first and the second mobile radio cells 61, 63. In particular, the first, second, third and fourth mobile stations 64, 65, 66, 67 measure the signal strength received by the first or second mobile network base stations 60, 62. Furthermore, the positions of the first, second, third and fourth mobile stations 64, 65, 66, 67 are determined based on GPS coordinates or indirectly given by cell identification or RF typical fingerprints. An antenna controller combines the cellular parameters measured by first, second, third and fourth mobile stations 64, 65, 66, 67 and the positioning data of first, second, third and fourth mobile stations 64, 65, 66, 67 to generate a master diagram of the coverage areas of the first and second radio cells 61, 63.

In the present example, there is a gap 68 between the first and the second radio cells 61, 63. This gap 68 causes a higher number of call drops measured by the third and the fourth mobile stations 66, 67, because the third and the fourth are located near the boundary of the first and second radio cells 61, 63. The gap 68 can be identified by the antenna controller by analysing the cellular parameters. In particular, decreased signal strength and a higher number of call drops measured by the third and the fourth mobile stations 66, 67 are indicators for the presence of the gap 68. Subsequently, the antenna controller controls an actuator of at least one antenna 4 of the first and/or second mobile network base station 60, 62 to adjust the orientation of the at least one antenna 4 in such a manner that the tilt is decreased. Decreasing the tilt causes a "longer" antenna beam, so that the range of the coverage area of the first and/or second mobile radio cell 61, 62 is increased and the gap 68 becomes closed (not shown in FIG. 6). Generally, also optimizing steps concerning the antenna beam width can be accomplished using the above mentioned method.

The above mentioned approach can also be used in bigger clusters 1 comprising an higher amount of mobile network base stations 3 preferably by using a generic optimization loop including the remote access of necessary input data of the mobile network base stations 3 and their associated mobile radio cells 2 (as radio measurements, antenna characteristics and base stations characteristics). In this case, the performance and the interference in the cluster 1 is optimized by combining and accessing the data of different sources in order to perform remote configuration of broadcast parameters of the mobile radio base stations 3 and their antenna systems.

In general, the method for optimization of broadcast characteristics of an antenna of a network base station according to the present invention provides a full closed loop for optimization parameters of antennas 4, mobile network base stations 3 and user equipments 5. The remote settings of the antennas 4 are in particular tilt, azimuth and beam width, wherein the remote settings of the user equipments 5 are given by standardised radio signalling and the remote settings of mobile network base stations 3 are given by state of the art remote management functionality. The current physical settings for the antennas 4 can be derived from radio measurements of the user equipments 5 as described above, wherein the settings of the user equipments 5 can be evaluated by the aid of standardised measurements and measurement events. The settings of the mobile network base stations 3 can be evaluated by performance monitoring functionality and trace system as state of the art remote management functionality. These parameters are automatically analysed and iteratively optimized due to the actual network performance. In particular, actual coverage and/or capacity problems of the network are solvable by tilt and/or azimuth changes.

While the invention has been particularly shown and described with reference to preferred embodiments thereof, it will be understood by those skilled in the art that various changes in form and details may be made therein without departing from the spirit and scope of the invention.

The invention claimed is:

1. A method for determining physical parameters of an antenna of a mobile network base station, the method comprising:
    measuring cellular parameters of a mobile radio cell corresponding to the mobile network base station using a plurality of user equipments;
    transmitting the cellular parameters from the plurality of user equipments to an antenna controller; and
    determining, using the antenna controller, at least one of the physical parameters of the antenna based on the cellular parameters and at least one of a history of the cellular parameters, as measured by the user equipments, and a history of physical parameters of the antenna;
    wherein the determining is based on respective locations of the user equipments; and
    wherein the method further comprises, prior to the determining, localizing the user equipments, using at least one of a plurality of mobile base stations and GPS data.

2. The method according to claim 1, wherein the at least one of the physical parameters of the antenna determined includes at least one of azimuth and tilt of the antenna.

3. The method according to claim 1, wherein the at least one of the physical parameters is determined based also on further cellular parameters of further mobile network base stations, as respectively measured by the user equipments.

4. The method according to claim 1, wherein at least one of the history of the cellular parameters and the history of physical parameters of the antenna are elaborated.

5. The method according to claim 1, further comprising adjusting, using an actuator controlled by the antenna controller, an orientation of the antenna based on the at least one of the physical parameters so as to optimize the orientation of the antenna.

6. The method according to claim 1, wherein the step of measuring the cellular parameters includes measuring signal strength values of the mobile network base station using the user equipments.

7. The method according to claim 6, wherein the user equipments measure at least one of received power of signals of the mobile network base station and received power of signals of further mobile network base stations.

8. The method according to claim 1, wherein the cellular parameters respectively measured by the user equipments include at least one of signal delay, data throughput, Bit Error rate, handover failure rate and call drop rate.

9. An antenna management system for optimization of broadcast characteristics of at least one antenna of a mobile network base station, the antenna management system comprising:
    a mobile radio cell provided by the at least one antenna of the mobile network base station;
    user equipments disposed in a coverage area of the mobile network base station; and
    an actuator configured to adjust the orientation of the at least one antenna based on cellular parameters measured by the user equipments and also based on at least one of a history of the cellular parameters, respectively measured by the user equipments, and a history of physical parameters of the at least one antenna;
    wherein the antenna management system is configured to:
        localize the user equipments using at least one of a plurality of mobile base stations and GPS data; and
        determine physical parameters of the at least one antenna based on location of the user equipments.

10. A program for optimization of broadcast characteristics of an antenna of a mobile network base station providing a mobile radio cell, the program comprising:
    a non-transitory, computer readable program code adapted to control an actuator so as to adjust an orientation of the antenna of the mobile network base station based on cellular parameters measured by user equipments disposed in the coverage area of the mobile network base station.

11. A processing unit configured to be operated in accordance with the program of claim 10.

* * * * *